(12) United States Patent
Davis (10) Patent No.: US 6,218,813 B1
(45) Date of Patent: Apr. 17, 2001

(54) CROSS CURRENT COMPENSATION SYSTEM AND METHOD

(75) Inventor: Gerald W. Davis, New Berlin, WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/409,451

(22) Filed: Sep. 30, 1999

(51) Int. Cl.[7] ................................................ H02P 9/14
(52) U.S. Cl. ............................ 322/20; 322/22; 322/25; 290/4 A
(58) Field of Search .................. 322/20, 22, 23, 322/24, 25, 28; 290/7, 8, 4 R, 4 A, 6

(56) References Cited

U.S. PATENT DOCUMENTS

| | | | |
|---|---|---|---|
| 3,702,965 | * 11/1972 | Drexler et al. | 322/25 |
| 3,758,843 | 9/1973 | Ishizaki et al. | 322/25 |
| 4,232,253 | 11/1980 | Mortelmans | 315/370 |
| 4,245,182 | 1/1981 | Aotsu et al. | 322/20 |
| 4,482,868 | 11/1984 | Whatley | 330/274 |
| 4,908,565 | * 3/1990 | Cook et al. | 322/10 |
| 5,302,906 | * 4/1994 | Lerch | 324/650 |
| 5,336,932 | * 8/1994 | Barske | 290/1 R |
| 5,483,147 | * 1/1996 | Ilic et al. | 322/25 |
| 5,515,001 | 5/1996 | Vranish | 330/69 |
| 5,559,421 | * 9/1996 | Miyakawa | 322/58 |
| 6,066,897 | * 5/2000 | Nakamura | 290/4 A |
| 6,072,303 | * 6/2000 | Nickoladze et al. | 322/20 |

* cited by examiner

*Primary Examiner*—Nicholas Ponomarenko
(74) *Attorney, Agent, or Firm*—Himanshu S. Amin; John J. Horn; A. M. Gerasimow (57) ABSTRACT

A cross current compensation system for controlling reactive currents in a generator is provided. A control system for receives voltage feedback from a first generator of a plurality of generators and cross current feedback from at least a second generator of the plurality of generators. The control system determines a phase angle based on the voltage feedback from the first generator and cross current feedback from the at least a second generator. The control system determines a compensation signal corresponding to the phase angle and cross current feedback. The control system modifying a generator excitation signal for the first generator based on the respective compensation signal and a bi-linear transformation technique.

17 Claims, 9 Drawing Sheets

CROSS CURRENT COMPENSATION SYSTEM AND METHOD

FIELD OF THE INVENTION

The present invention generally relates to a system and method for controlling reactive circulating currents in voltage generators. In particular, the present invention employs a bi-linear transformation technique to facilitate controlling reactive circulating currents.

BACKGROUND OF THE INVENTION

Power generation is a fundamental aspect of the modern technological age. The need for efficient power at affordable prices is found in many areas such as, for example, industrial, commercial, and consumer applications. Power needs are ever increasing as computer users demand more power. As the need for power increases, so does the need for uninterrupted power. Many industrial applications require twenty four hour a day operation, therefore, loss of power can have severe economic consequences. Many commercial applications, such as banking, require round the clock service to customers, and computer power must be maintained to provide such services. Even home consumers have increased needs for continuous power as a result of the home computer revolution.

One way power suppliers provide uninterrupted power is to employ parallel voltage generating systems. By paralleling generators, power can be delivered reliably because one generator can provide power for another when it fails. Technical problems must be overcome, however, because parallel generators may produce large reactive circulating currents flowing between the generators. Reactive circulating currents are therefore undesirable. Reactive currents increase generator power losses and reduce generator efficiency.

Analog systems have historically been employed to control reactive circulating currents. Although analog systems were able to accomplish the task, such systems were subject to drift and frequently required readjustment thereby increasing maintenance expenses and reducing reliability. As a consequence, digital systems have evolved to improve deficiencies of analog systems.

Digital control systems have mitigated the need to manually adjust control systems. Digital systems operate by computing control signals in response to generator feedback. Traditional analog systems rely on analog systems such as amplifiers, capacitors, diodes, and resistors to control necessary parameters to reduce reactive circulating currents. Digital systems, however, rely on control systems to compute the necessary parameters for controlling reactive circulating currents. Several of the determined parameters require complex algebra and trigonometry in conventional control systems. Therefore, fairly rigorous mathematical steps are necessary to determine the parameters. Rigorous mathematical computations produce inefficiencies in control systems by increasing the processing requirements of the controllers. Such inefficiencies contribute to increased power losses in the generators and may ultimately lead to increased costs to consumers.

Consequently, there is a strong need in the art for a system and/or method for controlling reactive circulating currents in voltage generators which mitigate some of the aforementioned problems associated with conventional systems and/or methods.

SUMMARY OF THE INVENTION

The present invention provides a system and method for controlling reactive circulating currents in voltage generators connected in a cross current configuration. In a cross current configuration, at least two controllers reduce reactive circulating currents simultaneously by sampling a portion of at least two generators reactive current. The sampled currents from each generator is combined and coupled to each controller. The sampled currents are then converted to voltages and fed back to each controller. Reactive currents are minimized when each controller simultaneously increases or decreases the respective generator excitation voltages to reduce the fed back voltages. The generator excitation voltages are increased or decreased based on the voltages from the cross current feed back and the reactive phase angle with respect to the line voltages of the generators.

The present invention minimizes reactive currents in a cross current configured system by applying a bi-linear transformation to a complex mathematical surface composed of key variables fed back from the generators. It has been found that control system performance may be improved significantly by reducing complex mathematical processing to a small series of efficient and reliable tasks.

More particularly, it has been found that a geometric analysis of key feedback variables from the voltage generator significantly reduce the trigonometric computations required of the control system. Key feedback variables include the generator line voltage, cross current feedback, and the reactive phase angle with respect to the generator line voltage and cross current feedback.

By analyzing the reactive phase angle with respect to cross current feedback, a three dimensional mathematical surface may be constructed describing a control compensation signal with respect to the reactive phase angle and current. The control compensation signal is produced by a controller to facilitate minimizing reactive circulating currents. By applying a geometric analysis to the three dimensional surface, a two dimensional bi-linear equation is produced which greatly reduces the computations necessary to produce the control compensation signal.

One aspect of the present invention provides for a cross current control system for controlling reactive currents in a generator. A control system receives voltage feedback from a first generator of a plurality of generators and cross current feedback from at least a second generator of the plurality of generators. The control system determines a phase angle based on the voltage feedback from the first generator and cross current feedback from the at least a second generator. The control system determines a compensation signal corresponding to the phase angle and cross current feedback. The control system modifies a generator excitation signal for the first generator based on the respective compensation signal and a bi-linear transformation technique.

Another aspect of the present invention provides for a cross current compensation system for controlling reactive currents in a generator; including: means for receiving voltage feedback from a first generator of a plurality of generators and cross current feedback from at least a second generator of the plurality of generators; means for determining a phase angle based on the voltage feedback from the first generator and cross current feedback from the at least a second generator; means for determining a compensation signal corresponding to the phase angle and cross current feedback; and means for modifying a generator excitation signal for the first generator based on the respective compensation signal and a bi-linear transformation technique.

Another aspect of the present invention provides for a method for controlling reactive currents in a generator;

including the steps of: receiving voltage feedback from a first generator of a plurality of generators and cross current feedback from at least a second generator of the plurality of generators; determining a phase angle based on the voltage feedback from the first generator and cross current feedback from the at least a second generator; determining a compensation signal corresponding to the phase angle and cross current feedback; and modifying a generator excitation signal for the first generator based on the respective compensation signal and a bi-linear transformation technique.

Another aspect of the present invention provides for a cross current compensation system for controlling reactive currents in a generator; including: a system for receiving voltage feedback from a first generator of a plurality of generators and cross current feedback from at least a second generator of the plurality of generators; a system for determining a phase angle based on the voltage feedback from the first generator and cross current feedback from the at least a second generator; a system for determining a compensation signal corresponding to the phase angle and cross current feedback; and a system for modifying a generator excitation signal for the first generator based on the respective compensation signal and a bi-linear transformation technique, the bi-linear transformation technique employing at least the following equation:

$$Z_c = [C \times X_p \times \theta_p];$$

wherein:

$Z_C$ provides the compensation signal which represents the negative of (voltage droop magnitude in per units–VCA magnitude in per units);

C is a constant defined by known endpoints of a plane representive of a three-dimensional relationship between a rated, per unit, burden voltage; a power factor phase angle; and voltage droop over the rated, per unit, range;

$X_p$ is a most recent burden voltage factor (VBR); and $\theta_p$ is a most recent power factor phase angle computed from the voltage and current feedback.

The system further employs the equation:

$$C = (Z_{P1} - Z_{P2}) / [(\theta_{P1} - \theta_{P2}) \times (X_{P5} - X_{P6})];$$

wherein: $Z_{P1}$ and $Z_{P2}$ are endpoints of a VDROOP axis within the predetermined range of the plane; $\theta_{P1}$ and $\theta_{P2}$ are endpoints of a power factor phase angle axis within the predetermined range of the plane; and $X_{P5}$ and $X_{P6}$ are endpoints of a VBR axis within the rated, per unit, range of the plane.

To the accomplishment of the foregoing and related ends, the invention, then, comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference numerals are used to refer to like elements throughout.

Figure 1A:
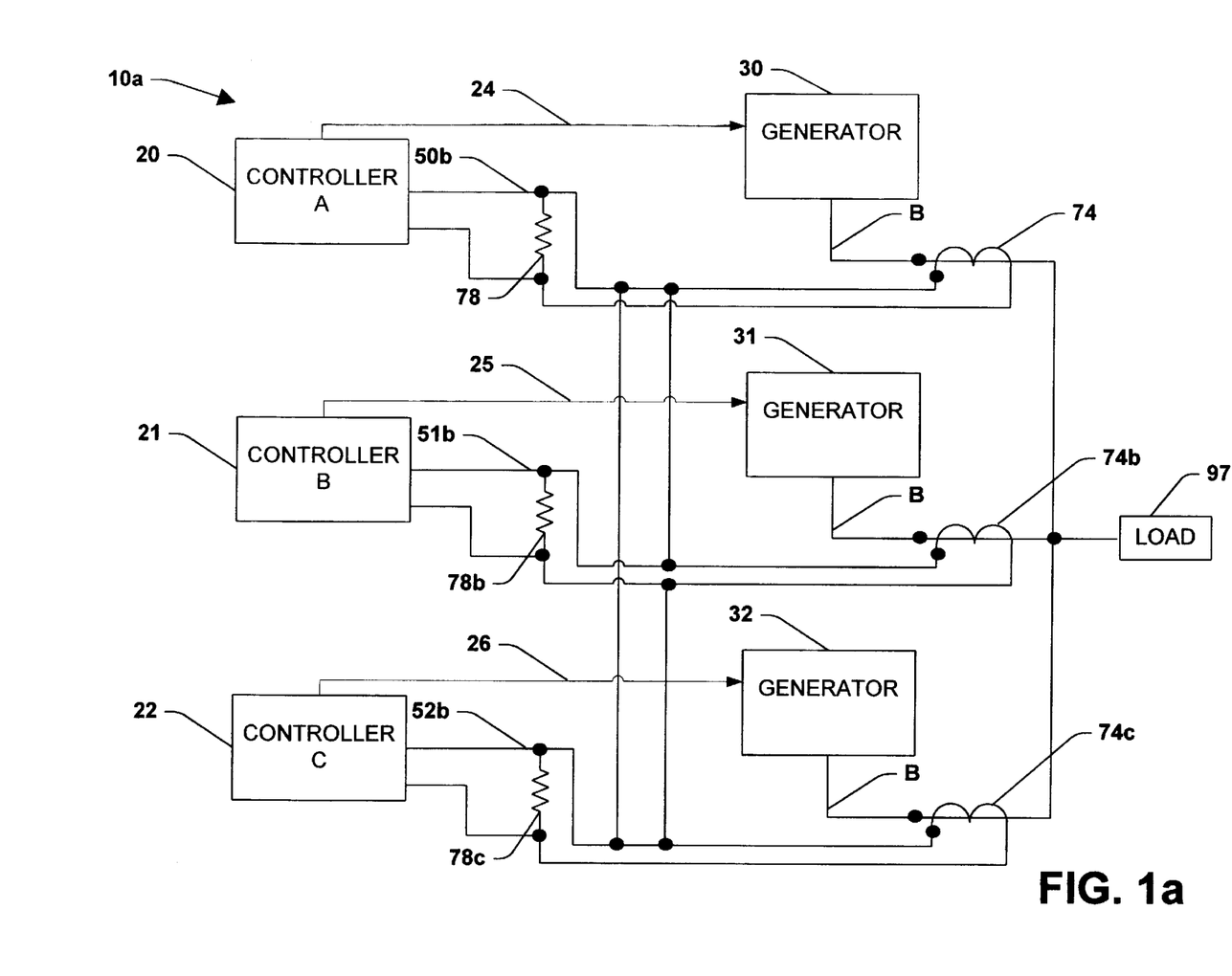
FIG. 1a is a schematic block diagram of a cross current configured control system for controlling reactive circulating currents in accordance with the present invention.

Referring initially to FIG. 1a, a parallel generating system 10a, is shown applying cross current feedback voltages 50b, 51b, and 52b to control reactive circulating currents that may flow between generators 30, 31, and 32. Note that only phase B of the three phase generators is shown connected together at a load 97. However, phase A and phase C of the generators are also connected together at the load 97 although not shown in FIG. 1a. Reactive currents may flow into or out of the generators 30, 31, and 32 when coupled together at the load 97. The generators 30, 31, and 32 are said to be paralleled when connecting the respective output voltages together at the load 97. The generators may be paralleled to provide back-up voltage capability to power consumers if one of the generators were to fail. Reactive circulating currents which flow as a result of parallel generator operation, cause increased power losses and therefore should be minimized.

Reactive circulating currents are minimized by the present invention by minimizing the cross current feedback voltages 50b, 51b, and 52b. The cross current feedback voltage 50b, 51b and 52b is developed across burden resistors 78, 78b, and 78c. Current is sampled from current transformers 74, 74b, and 74c from a single phase B of each generator 30, 31, and 32 and fed back to controllers 20, 21, and 22. It is critical that if the generators 30, 31, and 32 are of different power ratings, that current transformers 74, 74b, and 74c are chosen such that balanced performance is achieved for cross current compensation. For example, a current transformer for a generator having twice the rated power of the other generators must produce the same amount of current from the current transformer as the smaller generators running at rated power. Note that current sampled from the each generator is also cross coupled to the other controller circuits. If reactive circulating currents are flowing between generators, voltages may be developed across burden resistors 78, 78b, and 78c as shown FIG. 1b.

Figure 1B:
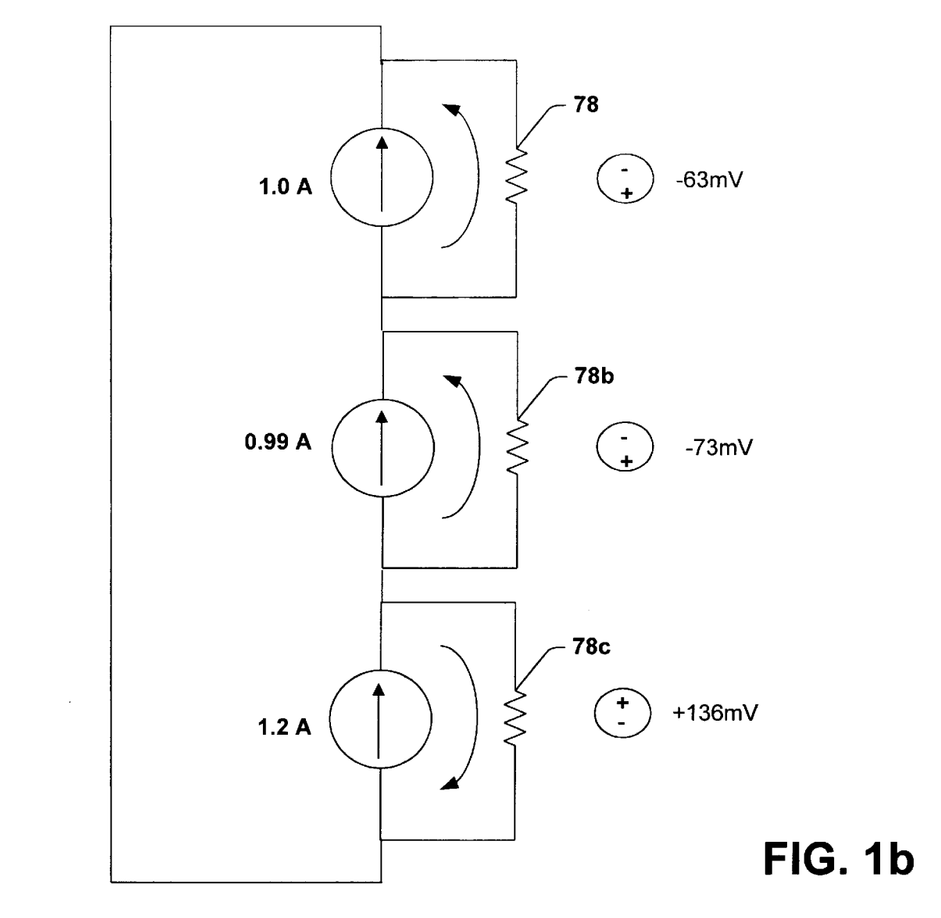
FIG. 1b is a functional block diagram of a cross current configured control system for controlling reactive circulating currents in accordance with the present invention.

Referring to FIG. 1b, a simplified diagram of cross current compensation is shown with unbalanced conditions (e.g., reactive circulating currents flowing between generators). Reactive currents of 1.0 A, 0.99 A, and 1.2 A are shown flowing through burden resistors 78, 78b, and 78c respectively. The voltages of −63 mV, −73 mV, and +136 mV are shown across burden resistors 78, 78b, and 78c. Note that reactive currents may flow in either direction. Since the voltages across each burden resistor 78, 78b, and 78c is a difference of all the feedback currents, each controller 20, 21, and 22 shown in FIG. 2a, will attempt to increase or decrease their respective generator excitation voltages 24, 25, and 26 accordingly to minimize the reactive circulating currents. As shown in FIG. 1b, −63 mV is across burden resistor 78, therefore the controller 20 will tend to reduce −63 mV to 0v. Likewise the controller 21 will tend to reduce −73 mV to 0v. Simultaneously, the controller 22 tends to reduce +136 mV more negatively to 0v.

When connected in a cross current configuration, all controllers tend to minimize reactive circulating currents simultaneously by increasing or decreasing the generator excitation voltages 24, 25, and 26. The burden voltages across resistors 78, 78b, and 78c are thereby reduced simultaneously by the controllers working in unison to minimize reactive currents. It is to be appreciated that a plurality of generating systems may be connected in a cross current configuration. The systems shown in FIGS. 1a and 1b show three systems for illustrative purposes only.

Figure 1C:
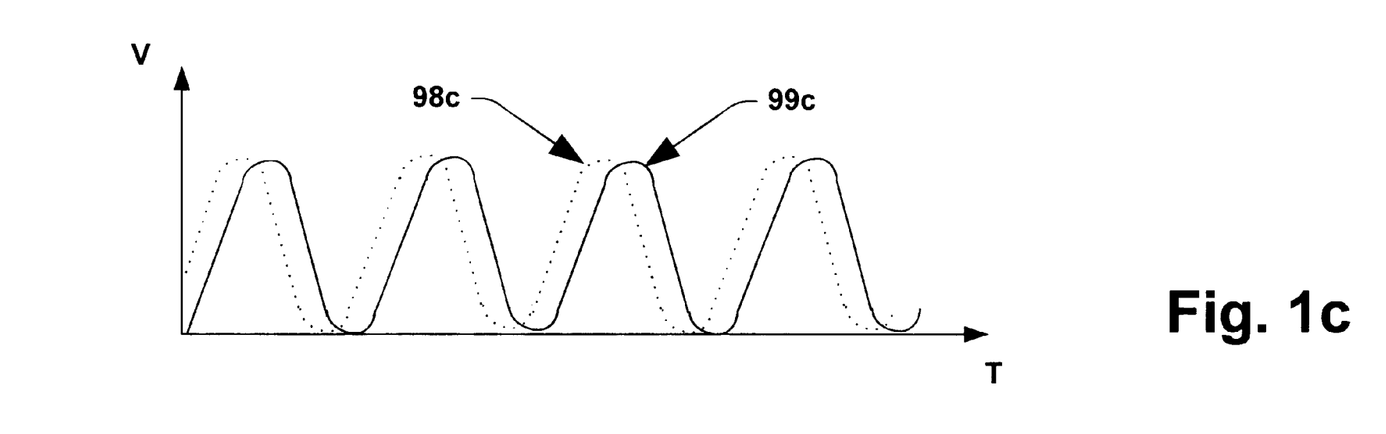
FIGS. 1c and 1d are waveform diagrams from a cross current configured control system in accordance with the present invention.
Figure 1D:
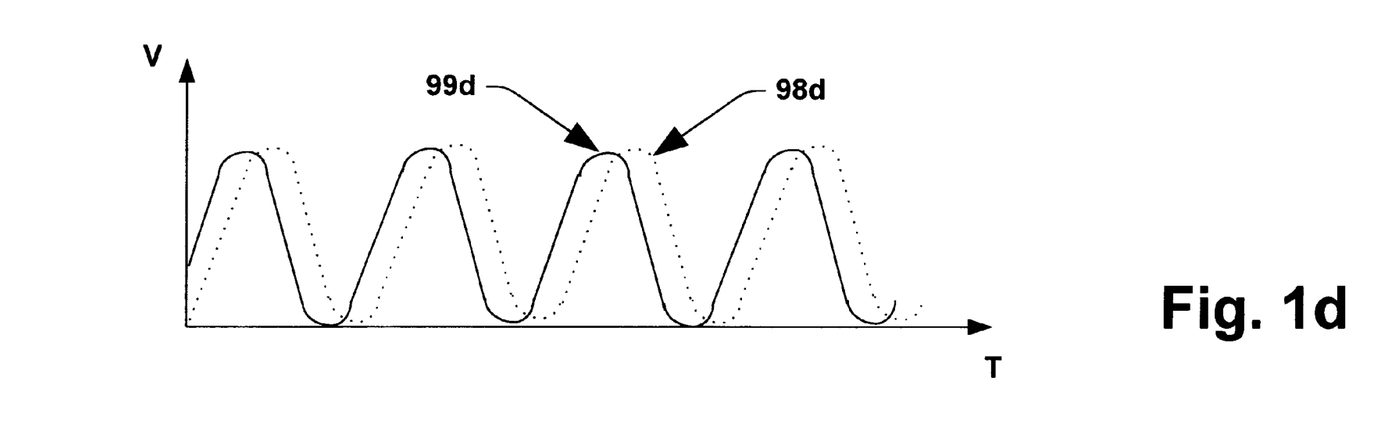

Now referring to FIGS. 1c and 1d, the burden resistor voltages 98c and 98d are shown with respect to terminal voltages from the generator 31 output terminals A and C referred to by line voltage VCA 99c and 99d. FIGS. 1c and 1d shows the burden resistor voltage with respect to VCA of generator 31 at higher and lower generator excitation voltages. In FIG. 1c, the line voltage VCA 99c is shown when the generator 31 excitation voltage 25 is 1 volt higher than the other two generators. The dotted waveform 98c represents the burden resistor voltage across burden resistor 78b. The two waveforms 98c and 99c are scaled the same for illustrative purposes. As shown, the burden resistor voltage 98c leads the line voltage VCA 99c by approximately 90 degrees.

In FIG. 1d, the line voltage VCA 99d is shown when the generator 31 excitation voltage 25 is 1 volt lower than the other two generators. The dotted waveform 98d represents the burden resistor voltage across burden resistor 78b. The two waveforms 98d and 99d are scaled the same for illustrative purposes. As shown, the burden resistor voltage 98d lags the line voltage VCA 99d by approximately 90 degrees. Therefore, when the reactive phase angle between the line voltage VCA and burden resistor voltage is a leading value as in FIG. 1c, the generator excitation 25 is to be reduced. Conversely, when the reactive phase angle between the line voltage VCA and burden resistor voltage is a lagging value as in FIG. 1d, the generator excitation 25 is to be increased.

The cosine of the reactive phase angle is known as the power factor. A reactive phase angle greater than zero degrees is said to be a leading power factor whereas a reactive phase angle less than zero degrees is said to be a lagging power factor. A phase angle equal to zero degrees is said to be unity power factor. Reactive circulating currents are minimum when the cross current feedback voltages are minimized. Thus, the desired state of operation for the controllers 20, 21, and 22 is to minimize cross current feedback voltages thereby minimizing reactive circulating current.

Figure 2A:
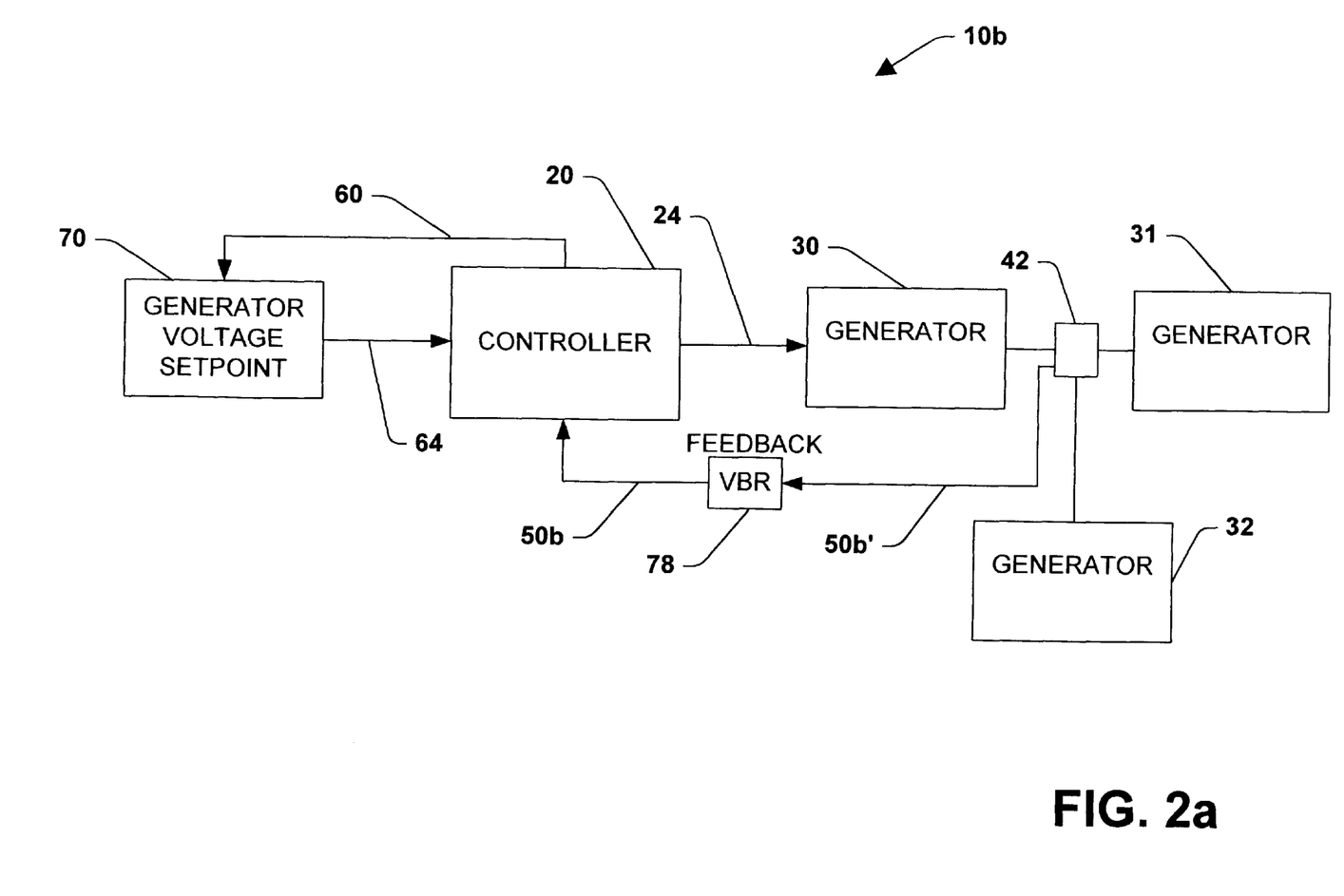
FIG. 2a is a schematic block diagram of a control system for controlling reactive circulating currents in accordance with the present invention.

Referring to FIG. 2a, a schematic block diagram of a control system 10b for controlling reactive circulating currents in accordance with the present invention is shown. The control system 10b employs a controller 20 to monitor and control reactive circulating currents in a generator 30. The controller 20 provides a generator excitation voltage 24 to control the voltage output and the reactive circulating current in the generator 30. A generator 31 and 32 are shown connected in parallel to generator 30 at a connection point 42. It is noted that generators 31 and 32 are connected in cross current compensation mode with the controllers 21 and 22 as shown in FIG. 1a, however, the controllers are not shown in FIG. 2a.

The controller 20 receives a feedback burden voltage VBR 50b from a VBR system 78. The VBR system 78 converts reactive cross current 50b' from the generators 30, 31, and 32 to the burden voltage VBR 50b. Referring briefly to FIG. 1a, the VBR system 78 is a current sense resistor. The feedback burden voltage 50b provides input to the controller 20 to determine if reactive circulating currents exist. As will be described in more detail below, the controller 20 determines a reactive phase angle between the feedback voltage 50b and the generator 30 line voltage to determine a compensation signal 60. The compensation signal 60 is employed to reduce reactive circulating currents thereby reducing the feedback voltage 50b.

The controller 20 employs a processor (not shown) for controlling the real-time operation of the control system 10b. During real-time operation, the controller 20 continuously monitors feedback 50b, determines the reactive phase angle, and generates the compensation signal 60 to reduce reactive currents. As described in more detail below, many controller processing operations may be required to determine the compensation signal 60. Therefore, the controller 20 employs a bi-linear transformation technique, not provided in conventional control systems, to determine the compensation signal 60 for controlling reactive circulating currents.

The bi-linear transformation technique, which will be described in greater detail below, greatly reduces the number and complexity of controller operations. The number and complexity of operations are reduced by transforming complex algebraic and trigonometric calculations into a bi-linear equation thereby simplifying the processing burden of the controller 20. Thus, higher speed control performance is achieved over conventional systems. A significant advantage of higher speed performance is that the real-time operating system of the controller 20 may control reactive circulating currents more precisely than conventional systems. In particular, higher precision control of reactive circulating currents is achieved because the controller 20 has more time to determine the compensation signal 60 than conventional systems. Also, because of higher speed operations, the controller 20 has increased time to monitor feedback 50 and minimize reactive currents by updating the compensation signal 60 more often than conventional systems. By controlling reactive circulating currents more precisely, reactive currents are minimized thereby decreasing power losses and increasing the efficiency of the generator 30. Thus, increased generator efficiency provides lower costs to power consumers because less power is lost due to reactive circulating currents. Another advantage the bi-linear transformation technique provides is, lower cost controllers may be employed to control reactive currents since the number and complexity of the controller 20 operations are diminished.

The controller 20 controls reactive circulating currents in the generator 30 via the generator excitation voltage 24. The generator excitation voltage 24 is determined from a control input 64. The control input 64 is determined as the difference between a generator voltage set point 70 and the compensation signal 60. The generator voltage set point 70 is the desired voltage output of the generator determined by a user. To minimize reactive circulating currents, the controller 20 continuously monitors feedback 50b and updates the compensation signal 60. If a voltage is detected at feedback 50b, the controller increases or decreases the compensation signal 60 causing control input 64 to change. As the control input 64 changes, the generator excitation 24 changes, and the reactive circulating currents may be controlled. As will be described in more detail below, the control input 64 is provided to the controller 20 from a summation point that combines the generator voltage set point 70 and the compensation signal 60.

Figure 2B:
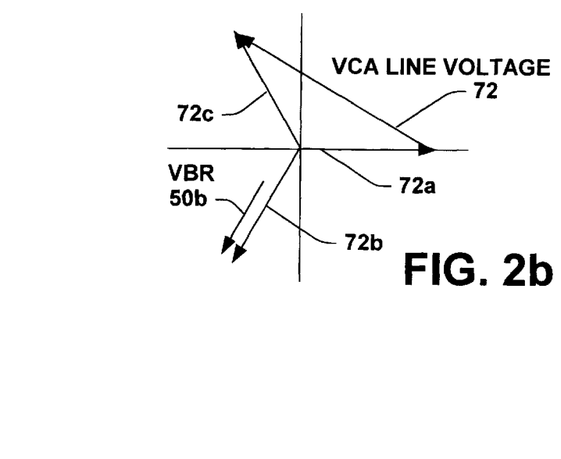
FIGS. 2b and 2c are phasor diagrams for a control system for controlling reactive circulating currents in accordance with the present invention.
Figure 2C:
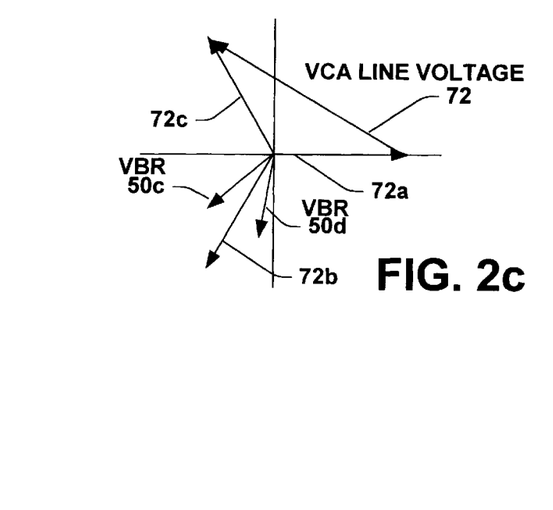
Figure 2D:
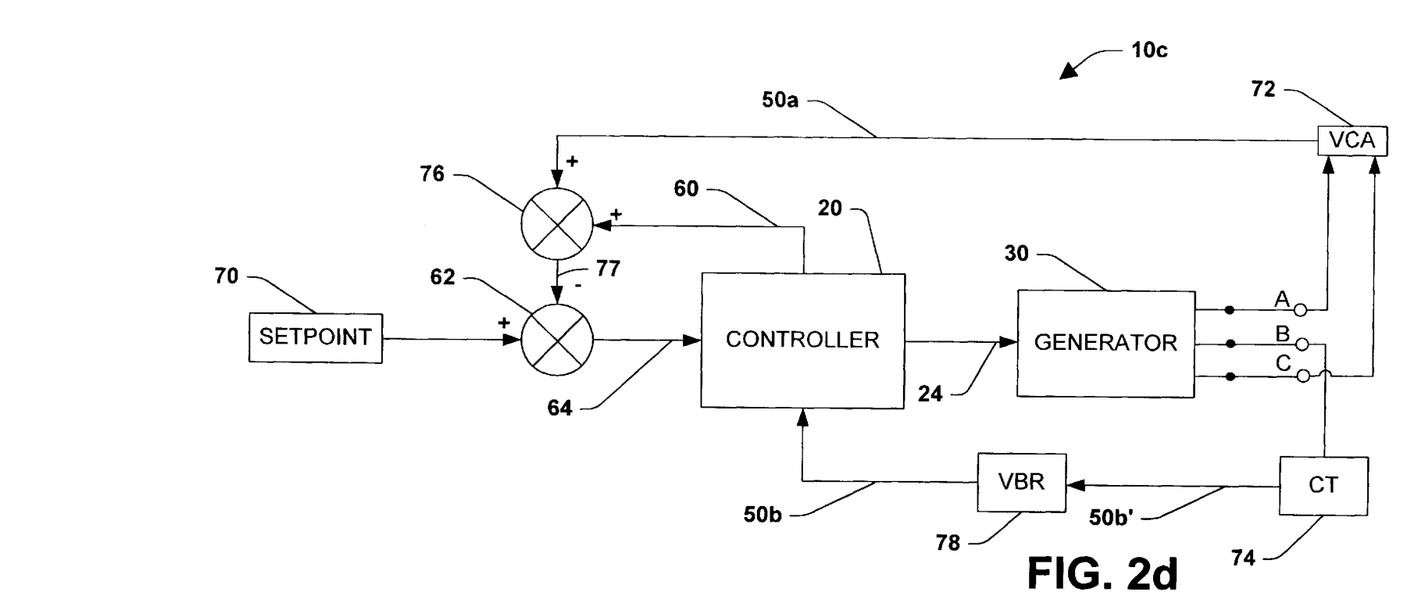
FIG. 2d is a schematic block diagram of a control system for controlling reactive circulating currents in accordance with the present invention.

Referring now to FIG. 2b, a phasor diagram of the various system voltages employed by a system 10c of FIG. 2d is shown. The generator 30 terminal output voltage phasors VA 72a, VB 72b, and VC 72c are shown in a phasor diagram. The line voltage, VCA 72 is shown as the vector summation of VA 72a and VC 72c. As will be described in more detail below, a voltage phasor VBR 50b is produced by the system 10c in FIG. 2d that represents the cross current feedback. As reactive circulating currents increase or decrease, the cross current feedback voltage 50b increases or decreases as shown in FIG. 1b. In FIG. 2c, the reactive phase angle of a VBR 50c with respect to the generator voltage is shown when lagging reactive circulating currents are present. Also, referring to FIG. 2c, a VBR 50d is shown when leading reactive circulating currents are present.

Now referring to FIG. 2d, a more detailed schematic block diagram of control system 10c illustrates how the controller 20 employs voltage and cross current feedback 50a and 50b to determine the compensation signal 60 for controlling reactive currents. The generator 30 produces a three phase output voltage at terminals A, B, and C. A voltage VCA 72, which represents the line voltage from terminal C and terminal A, is fed back and summed with the compensation signal 60 at a summing junction 76. The output 77 of the summing junction 76 is summed with the set point 70 at a summing junction 62 to provide the control input 64.

Coupled to terminal B of generator 30 is a current transforming system 74. The current transforming system 74 in the preferred embodiment is a step down current transformer. It is to be appreciated that other suitable systems and/or methods for providing current feedback may be employed to carry out the present invention. The current transforming system 74 provides reactive circulating current to a VBR 78 system. The VBR 78 system converts the reactive circulating current from the current transforming system 74 to a burden voltage VBR 50b. In the preferred embodiment, a burden resistor (not shown) of about 1Ω is employed by the VBR system 78 to provide the burden voltage VBR 50b. It is to be appreciated that other resistance values and/or voltage conversion techniques may be employed by the VBR 78 system.

As will be discussed in greater detail below, an approximate 90 degree right angle phase relationship between VBR 50b and VCA 72 indicates minimum reactive circulating currents are flowing. If phase relationships other than 90 degrees are detected between VBR 50b and VCA 72, the controller 20 will determine a compensation signal 60 that increases or decreases the generator excitation voltage 24. By increasing or decreasing the generator excitation voltage 24, reactive circulating currents can be minimized.

Figure 3A:
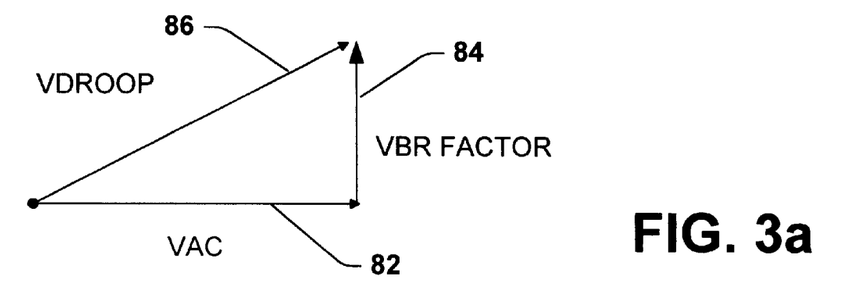
FIGS. 3a, 3b, and 3c are phasor diagrams of a control signal with respect to voltage and current feedback in accordance with the present invention.

Now referring to FIGS. 3a through 3c in conjunction with FIG. 2d, detailed functions of the controller 20 are described. FIG. 3a illustrates a 90 degree relationship between a phasor VCA 82 and a phasor VBR factor 84. The VCA 82 phasor is the same as VCA 72 in FIG. 2d but rotated 120 degrees and as described below, expressed in "per unit" units. The phasors VCA and VBR factor form a phasor triangle with a resultant VDROOP 86 hypotenuse. As will be described below, VDROOP 86 is employed to produce the controller 20 compensation signal 60.

The VBR factor 84 is a product of VBR 50b from FIG. 2d, a scale factor (not shown) and droop percentage (not shown). The scale factor (SF), as will be illustrated below, is employed to computationally adjust the factors of VBR 84 and VCA 82 into a "per unit" simplifying conversion. For example, the scale factor allows for the determination of VDROOP 86 at the rated VCA 82 and VBR 84 without computing voltages and currents having values other than 1. The droop percentage defines the maximum amount of VDROOP 86 at the rated VBR 84 and rated VCA 82. In the preferred embodiment, the droop percentage may vary from 0 to 100%. As an example, to demonstrate the functions of the present invention, a droop percentage of 10% is chosen. Therefore, at rated voltage and current, VBR=1 or 100%, VCA=1 or 100%, and droop percentage=0.1 or 10%.

Figure 3B:
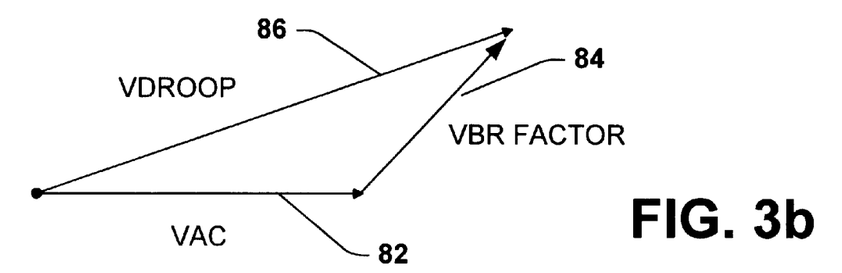

FIG. 3b illustrates a phasor relationship between the VBR factor 84 and VCA 82 of greater than 90 degrees or a lagging power factor. As shown in FIG. 3b, the VDROOP 86 phasor is greater in magnitude. As will be described below, a greater magnitude VDROOP 86 phasor produces a greater magnitude compensation signal 60. This in turn produces a larger input voltage to the controller 30 thereby increasing the generator excitation 24.

Figure 3C:
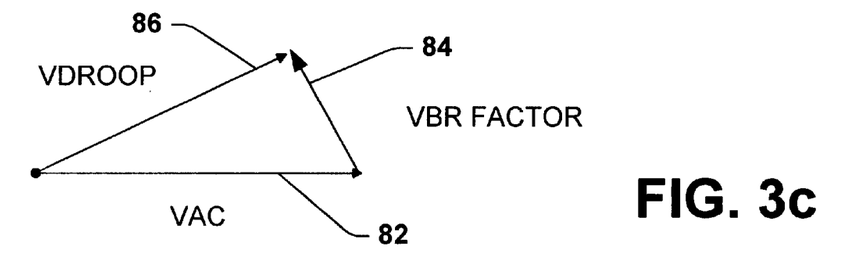

FIG. 3c illustrates a phasor relationship between the VBR factor 84 and VCA 82 of less than 90 degrees or a leading power factor. As shown in FIG. 3c, the VDROOP 86 phasor is smaller in magnitude. As will be described below, a smaller magnitude VDROOP 86 phasor produces a smaller magnitude compensation signal 60. This in turn produces a smaller input voltage to the controller 30 thereby decreasing the generator excitation 24.

Determination of the VDROOP signal 86 may be determined by applying trigonometric and algebraic computations. Referring to FIG. 3b for example, and applying the law of cosines, VDROOP 86 may be determined in Equation 1 as follows:

$$(VDROOP)^2 = VCA^2 + (VBR \times DP \times SF) - 2[(VCA \times DP \times SF)] \cos(90° + \theta) \quad \text{Equation 1:}$$

It is noted that θ is the angle between the VBR 50c or 50d and Vb 72b in FIG. 2c. Under maximum lagging compensation conditions, employing an example droop percentage of 10%, VDROOP is defined as 110% or 1.1, and θ is defined as $-\cos^{-1}(0.8) = -36.869°$. By employing a per unit rating of VBR=VCA=1, and applying the example droop percentage as 10%, Equation 1 simplifies to Equation 2 as follows:

$$(1.1)^2 = 1 + (1 \times 0.1 \times SF) - 2[(1 \times 0.1 \times SF)] \cos(90° + \theta) \quad \text{Equation 2:}$$

By applying the quadratic equation to Equation 2, and solving for the scale factor SF, the following solution is shown in Equation 3 as follows:

$$SF = 1.54983 \quad \text{Equation 3:}$$

It is noted that different factors, percentages, and angles may be employed to produce different scale factors for different applications.

After determining the scale factor, the controller 20 may compute the value of VDROOP as shown in Equation 1 above. Trigonometric computations shown in Equation 1 may require excessive controller processing bandwidth. Therefore, a bi-linear transformation technique, as described below will be employed to greatly simplify the VDROOP computation and improve the controller 20 performance.

Figure 4:
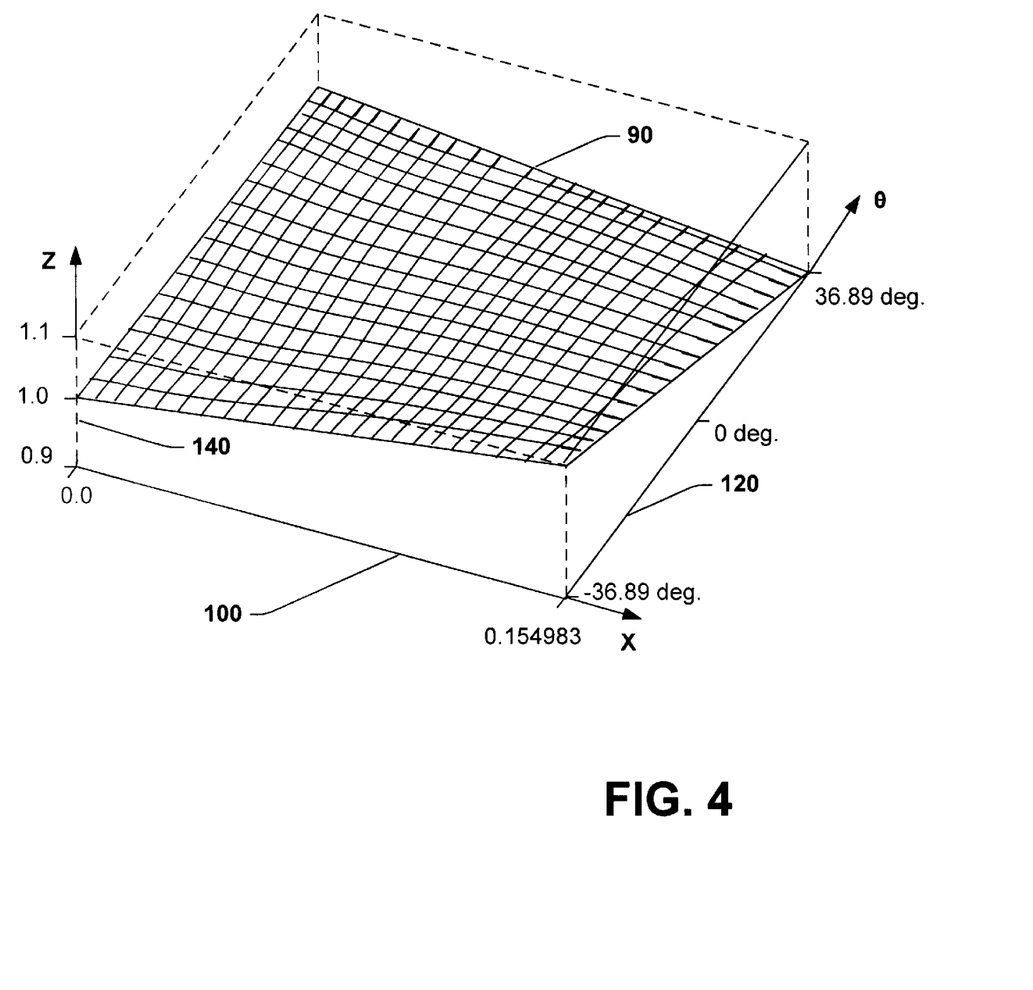
FIG. 4 is a three dimensional surface diagram illustrating a geometric relationship between feedback variables and the controller compensation phasor magnitude in accordance with the present invention.

Referring to FIG. 4, a surface 90 illustrates a three dimensional relationship between a VBR factor 100 axis, plotted on the X axis, versus a power factor angle 120 axis, plotted on the θ axis in degrees, versus a VDROOP 140, plotted on the Z axis in "per unit" units is shown. The VBR factor 100 axis ranges from 0 to 0.154983. As explained above, the VBR factor 100 is (VBR·Scale Factor·droop percentage). The power factor angle 120 axis ranges from −θ max to +θ max. The power factor angles 120 range from a power factor of 0.8 leading correlating to an angle 36.87 degrees, to a power factor of 0.8 lagging or an angle of −36.87 degrees. As shown on the Z-axis, the VDROOP 140 axis ranges from 1.1 or 110%, to 0.9 or 90%. It is to be appreciated that other percentage ranges for VDROOP may be chosen.

As surface 90 illustrates, a fairly linear or planar surface results when plotting the VDROOP 140, VBR factors 100, and power factor angles 120. By applying geometric analysis to the surface 90, a bi-linear equation may be derived to provide a high speed and efficient technique for computing VDROOP.

Figure 5A:
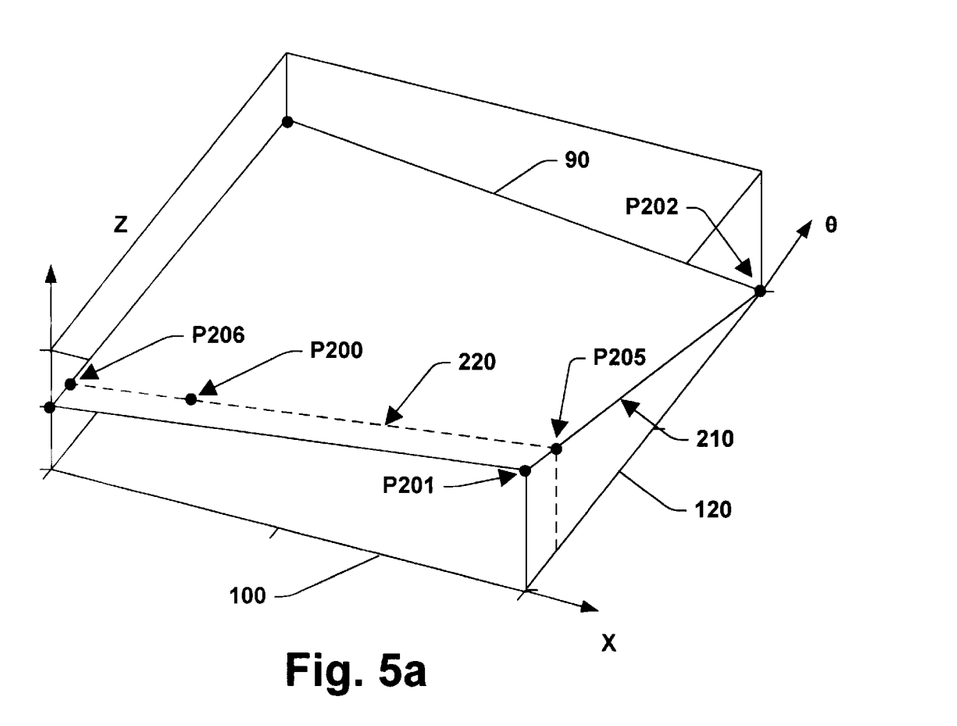
FIGS. 5a, 5b, and 5c are diagrams illustrating a bi-linear transformation within the three dimensional surface in FIG. 4 in accordance with the present invention.

Now referring to FIG. 5*a*, a point P200, is shown which represents a desired VDROOP 140. It is desired to compute P200 specifically without employing trigonometric computations during real-time operations of the controller 20.

Figure 5B:
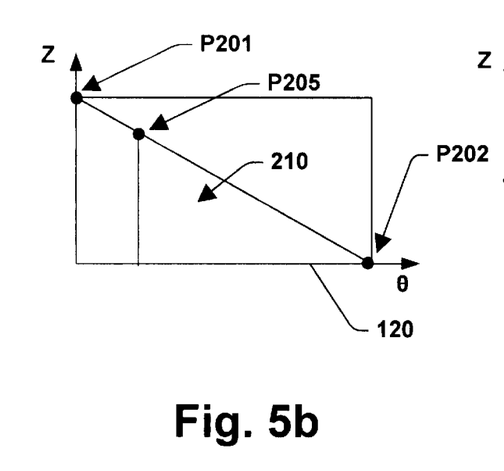

Referring to FIG. 5*b*, a Z and θ plane 210 is shown containing points P201, P205, and P202. Note how the Z and θ plane 210 is perpendicular to the X axis shown in FIG. 5*a*. As shown in FIGS. 5*a* and 5*b*, P205 which is part of plane 210, also is part of an intersecting Z and X plane 220 shown in FIG. 5*c*. From FIGS. 5*b* and 5*c*, a set of equations may be developed to determine the VDROOP at P200.

The general equation for a line shown in Equation 4 yields:

$$(y - y_2)/(x - x_2) = (y_1 - y_2)/(x_1 - x_2) \quad \text{Equation 4:}$$

From which the Z value for P$_{205}$ is given from the coordinates of P201, P202, and θ axis value of P205:

$$Z_{P205} = [(Z_{P201} - Z_{P202}/\theta_{P201} - \theta_{P202}) \times (\theta_{P200} - \theta_{P202})] + Z_{P202} \quad \text{Equation 5:}$$

where P201, P202, and P205 are defined in three dimensional coordinates shown in Equations 6, 7, and 8 and FIG. 5*a*:

$$P201 = (X_{P201}, \theta_{P201}, Z_{P201}) = (0.154983, -36.87°, 1.1) \quad \text{Equation 6:}$$

$$P202 = (X_{P202}, \theta_{P202}, Z_{P202}) = (0.154983, +36.87°, 0.9) \quad \text{Equation 7:}$$

$$P205 = (X_{P205}, \theta_{P205}, Z_{P205}) = (0.154983, \theta_{P200}, Z_{P205}) \quad \text{Equation 8:}$$

Figure 5C:
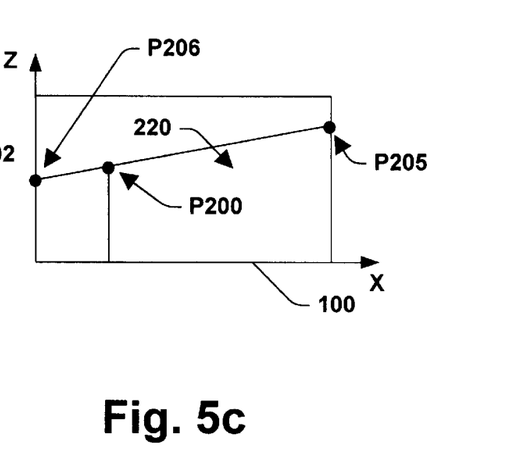

From Equation 8, it can be seen that $\theta_{P205}$ and $\theta_{P200}$ have the same θ value. Now observing FIG. 5*c*, P206 may be calculated as P205 in FIG. 5*b*.

$$P206 = (X_{P206}, \theta_{P206}, Z_{P206}) = (0, \theta_{P200}, 1.0) \quad \text{Equation 9:}$$

Note that P205, P206, and P200 all have the same θ value. The Z value for P206 is 1.0 corresponding to a VBR factor 140 of 0.0. The Z value for P200 is given by:

$$Z_{P200} = [(Z_{P205} - Z_{P206}/X_{P205} - X_{P206}) \times (X_{P200} - X_{P206})] + X_{P206} \quad \text{Equation 10:}$$

By combining Equations 5 and 10, the following equation is derived:

$$Z_{P200} = 1 - [C \times X_{P200} \times \theta_{P200}] \quad \text{Equation 11:}$$

where C is a constant defined by the known endpoints of the plane 210 in FIG. 5*b* and the plane 220 in FIG. 5*c*. $X_{P200}$ is the most recent VBR factor produced from the current feedback 50*b* to the controller 20 shown in FIG. 2*d*. $\theta_{P200}$ is the most recent power factor angle computed from the Vb 72*b* and VBR 50*b*. The compensation signal 60, referred to as Zc, is provided from VDROOP 140 and represents the negative of ( voltage droop magnitude in per units−VCA magnitude in per units). Due to the circuit properties of a cross current configured system, a sign inversion is required. It follows then that $Z_c = -[Z_{P200} - 1]$ which represents $[C \times X_{P200} \times \theta_{P200}]$.

$$C = (Z_{P201} - Z_{P202})/[(\theta_{P201} - \theta_{P202}) \times (X_{P205} - X_{P206})] \quad \text{Equation 12:}$$

Equation 12 and the Scale Factor maybe computed a single time at initialization of the controller 20. Thereafter, during real-time operation of the controller, Equation 11 provides an extremely fast and efficient method for determining the next value of VDROOP.

Figure 6:
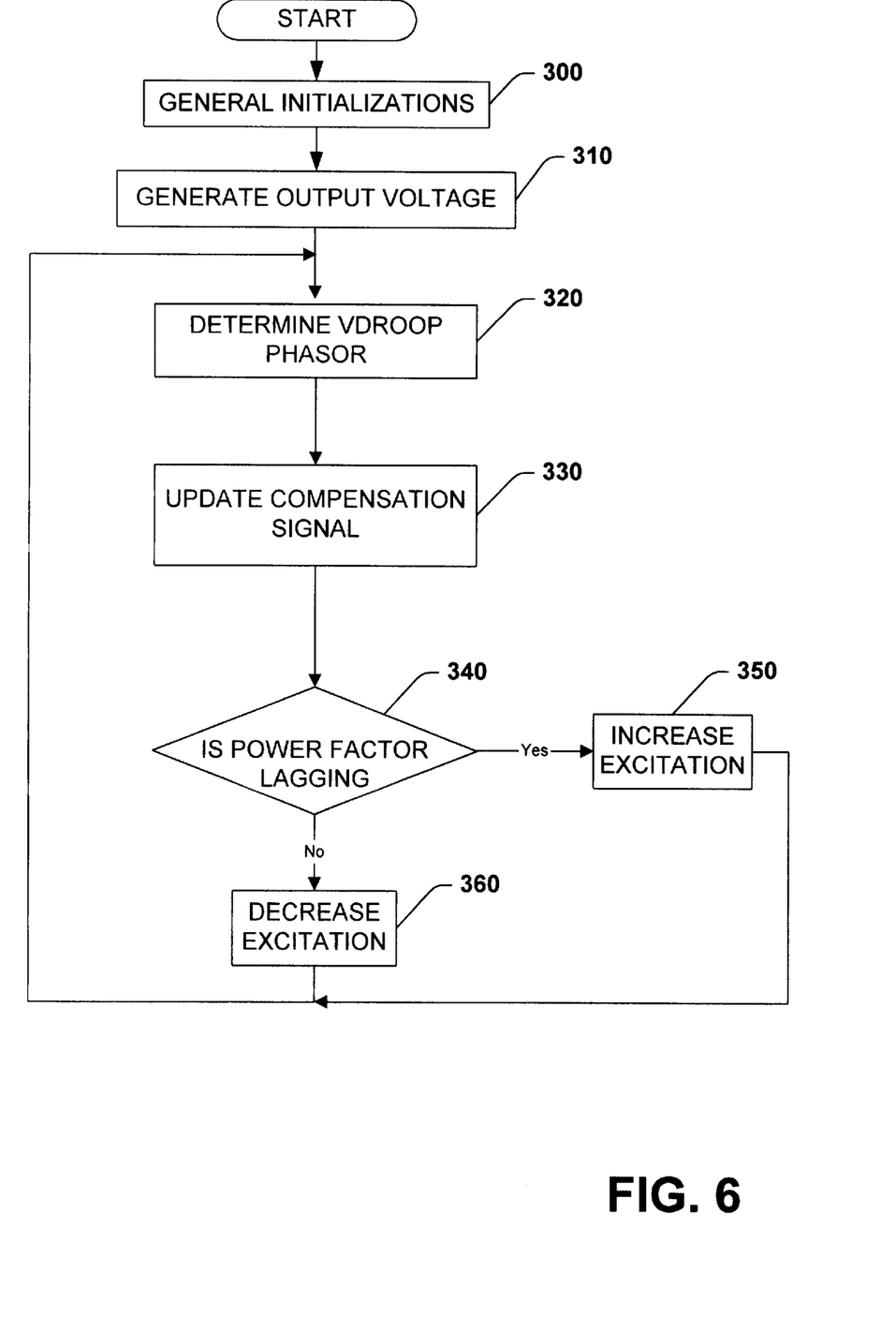
FIG. 6 is a flow diagram of a methodology for controlling reactive circulating currents in accordance with the present invention.

Referring to FIG. 6, a method for controlling reactive currents is shown. The method refers to the control system 10 shown in FIG. 2*c*, and to equations 1 through 12 mentioned above. Starting at step 300, the method proceeds to initialize key variables and determine key parameters for the controller 20 operation. The method determines a scale factor as demonstrated in equations 1 through 3. Also during controller 20 initialization, the method determines a constant C as shown in equation 12 and proceeds to step 310.

At step 310, the method outputs a generator excitation voltage 24 and proceeds to step 320. At step 320, the method determines the VDROOP phaser angle and magnitude as described in equation 11 above and proceeds to step 330. At step 330, the compensation signal 60, defined as Zp, is determined and the method updates the compensation signal 60 with the latest value of Zp. The method then proceeds to step 340.

At step 340, the method determines if the power factor is lagging. If the power factor is lagging, the method proceeds to step 360 and increases generator excitation. If the power factor is not lagging at step 340, the method proceeds to step 370 and decreases generator excitation. From either step 360 or 370, the method proceeds back to step 330 to determine another VDROOP phasor.

It should be understood that the math terminology describing bi-linear equations as used herein would relate to all forms of such equations including bi-linear polynomials and the like. For example, a preferred embodiment of the present invention which provides adequate accuracy has previously described the use of a bi-linear first order term in the form of Z=C×q×X within the transformation technique. However, the use of a bi-linear polynomial in the general form of $Z = a(x \times y) + b(x \times y)^2 + c(x \times y)^3 + \frac{1}{4}$ could be utilized to provide greater accuracy. Further, in an alternative embodiment, the law of cosines as previously described could be utilized in a control system without simplifying the computations with the transformation technique.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A cross current compensation system for controlling reactive currents in a generator; comprising:

a control system for receiving voltage feedback from a first generator of a plurality of generators and cross current feedback from at least a second generator of the plurality of generators, the control system determining a phase angle based on the voltage feedback from the first generator and cross current feedback from the at least a second generator, the control system determining a compensation signal corresponding to the phase angle and cross current feedback, the control system modifying a generator excitation signal for the first generator based on the respective compensation signal and a bi-linear transformation technique.

2. The system of claim 1, further including a resistive element for converting the cross current feedback to voltage.

3. The system of claim 2, further including a current transforming system to facilitate providing phase current to the respective resistive elements.

4. The system of claim 1, the control system further including a first summing system to combine the compensation signal with a line voltage of the first generator to provide a first output.

5. The system of claim 4, further including a second summing system to combine the first output with a voltage set point, the voltage set point setting a voltage level of the first generator, to provide a control input to a controller.

6. The system of claim 5, the controller employing the control input in determining a desired level of excitation voltage to be applied to the first generator.

7. The system of claim 1, the bi-linear technique employing at least the following equations:

$$Z_c = [C \times X_P \times \theta_P];$$

wherein:

$Z_c$ provides the compensation signal which represents the negative of (a voltage droop magnitude in per units – a VCA magnitude in per units);

C is a constant defined by known endpoints of a plane representive of a three-dimensional relationship between a rated, per unit, burden voltage; a power factor phase angle; and voltage droop over the rated, per unit, range;

$X_P$ is a most recent burden voltage factor (VBR); and $\theta_P$ is a most recent power factor phase angle computed from the voltage and current feedback.

8. The system of claim 7 further employing the equation:

$$C = (Z_{P1} - Z_{P2})/[(\theta_{P1} - \theta_{P2}) \times (X_{P5} - X_{P6})];$$

wherein:

$Z_{P1}$ and $Z_{P2}$ are endpoints of a VDROOP axis within the predetermined range of the plane;

$\theta_{P1}$ and $\theta_{P2}$ are endpoints of a power factor phase angle axis within the predetermined range of the plane; and $X_{P5}$ and $X_{P6}$ are endpoints of a VBR axis within the rated, per unit, range of the plane.

9. A cross current compensation system for controlling reactive currents in a generator; comprising:

means for receiving voltage feedback from a first generator of a plurality of generators and cross current feedback from at least a second generator of the plurality of generators;

means for determining a phase angle based on the voltage feedback from the first generator and cross current feedback from the at least a second generator;

means for determining a compensation signal corresponding to the phase angle and cross current feedback; and means for modifying a generator excitation signal for the first generator based on the respective compensation signal and a bi-linear transformation technique.

10. A method for controlling reactive currents in a generator; comprising:

receiving voltage feedback from a first generator of a plurality of generators and cross current feedback from at least a second generator of the plurality of generators;

determining a phase angle based on the voltage feedback from the first generator and cross current feedback from the at least a second generator;

determining a compensation signal corresponding to the phase angle and cross current feedback; and modifying a generator excitation signal for the first generator based on the respective compensation signal and a bi-linear transformation technique.

11. A cross current compensation system for controlling reactive currents in a generator; comprising:

a system for receiving voltage feedback from a first generator of a plurality of generators and cross current feedback from at least a second generator of the plurality of generators;

a system for determining a phase angle based on the voltage feedback from the first generator and cross current feedback from the at least a second generator;

a system for determining a compensation signal corresponding to the phase angle and cross current feedback; and a system for modifying a generator excitation signal for the first generator based on the respective compensation signal and a bi-linear transformation technique, the bi-linear transformation technique employing at least the following equation:

$$Z_C = [C \times X_P \times \theta_P];$$

wherein:

$Z_C$ provides the compensation signal which represents the negative of (a voltage droop magnitude in per units – a VCA magnitude in per units);

C is a constant defined by known endpoints of a plane representive of a three-dimensional relationship between a rated, per unit, burden voltage; a power factor phase angle; and voltage droop over the rated, per unit, range;

$X_P$ is a most recent burden voltage factor (VBR); and $\theta_P$ is a most recent power factor phase angle computed from the voltage and current feedback.

12. The system of claim 11, further employing the equation:

$$C = (Z_{P1} - Z_{P2})/[(\theta_{P1} - \theta_{P2}) \times (X_{P5} - X_{P6})];$$

wherein:

$Z_{P1}$ and $Z_{P2}$ are endpoints of a VDROOP axis within the predetermined range of the plane;

$\theta_{P1}$ and $\theta_{P2}$ are endpoints of a power factor phase angle axis within the predetermined range of the plane; and $X_{P5}$ and $X_{P6}$ are endpoints of a VBR axis within the rated, per unit, range of the plane.

13. The system of claim 11, further including a resistive element for converting the cross current feedback to a voltage.

14. The system of claim 12, further including a current transforming system to facilitate providing phase current to the resistive element.

15. The system of claim 11, the control system further including a first summing system to combine the compensation signal with a line voltage of the first generator to provide a first output.

16. The system of claim 11, the control system further including a second summing system to combine the first output with a voltage set point, the voltage set point setting a voltage level of the first generator, to provide a control input to a controller.

17. The system of claim 16, the controller employing the control input in determining a desired level of excitation voltage to be applied to the first generator.

* * * * *